(12) United States Patent
Thalgott et al.

(10) Patent No.: US 9,409,359 B2
(45) Date of Patent: Aug. 9, 2016

(54) DEVICE FOR SUPPORTING A RAW RUBBER TIRE FOR THE MANUFACTURE OF A PNEUMATIC TIRE

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Sebastien Thalgott, Clermont-Ferrand (FR); Julien Moynet, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 0 days.

(21) Appl. No.: 14/405,832

(22) PCT Filed: May 23, 2013

(86) PCT No.: PCT/FR2013/051115
§ 371 (c)(1),
(2) Date: Dec. 5, 2014

(87) PCT Pub. No.: WO2013/182772
PCT Pub. Date: Dec. 12, 2013

(65) Prior Publication Data
US 2015/0165704 A1   Jun. 18, 2015

(30) Foreign Application Priority Data
Jun. 6, 2012 (FR) ..................... 12 55262

(51) Int. Cl.
*B29D 30/00* (2006.01)
*B66C 1/54* (2006.01)

(52) U.S. Cl.
CPC .............. *B29D 30/0016* (2013.01); *B66C 1/54* (2013.01); *B29D 2030/0022* (2013.01)

(58) Field of Classification Search
CPC ........... B29D 30/0016; B29D 30/0603; B29D 2030/0022; B29D 2030/0027; B29D 2030/0044; B66C 1/54; B25J 15/0028; B25J 15/0047; B25J 15/0266
USPC ........................... 294/93–95, 97, 902; 425/38
See application file for complete search history.

(56) References Cited

U.S. PATENT DOCUMENTS 1,734,360 A * 11/1929 Bittman .................. B21C 47/30
                                                242/559.4
1,735,713 A * 11/1929 Alltop ....................... B66C 1/54
                                                248/306

(Continued)

FOREIGN PATENT DOCUMENTS

JP       57148638       9/1982
WO    2011128584 A1   10/2011

OTHER PUBLICATIONS

Written Opinion of the International Search Authority PCT/FR2013/051115 dated Jun. 10, 2015.

(Continued)

*Primary Examiner* — Dean Kramer
(74) *Attorney, Agent, or Firm* — Dickinson Wright PLLC

(57) ABSTRACT

Device for supporting a raw rubber tire for the manufacture of a pneumatic tire having arms, each bearing a block articulated to the arm and arranged to extend above it. Each block has an upper face arranged to support an upper bead of a tire and a lower face arranged to be actuated by a lower bead of the tire. Each block is arranged such that, with the block extending as a projection from the arm in a direction radial to a main axis of the device on an opposite side of the arm to the axis, an upward force on the lower face places the block in a position in which it no longer extends as a projection from the arm in the radial direction on that side of the arm.

15 Claims, 5 Drawing Sheets

(56) References Cited

U.S. PATENT DOCUMENTS

| | | | | |
|---|---|---|---|---|
| 2,533,795 A | * | 12/1950 | Hansen, Jr. | B66C 1/585 294/118 |
| 2,613,983 A | * | 10/1952 | Knudsen | B25B 27/06 29/262 |
| 2,927,343 A | | 3/1960 | Soderquist | |
| 3,337,173 A | | 8/1967 | Soderquist | |
| 3,809,423 A | * | 5/1974 | Gazuit | B66C 1/54 294/195 |
| 3,845,979 A | | 11/1974 | Schatz | |
| 3,901,547 A | * | 8/1975 | Skinner, II | B25J 15/103 294/106 |
| 4,236,883 A | * | 12/1980 | Turk | B29D 30/0603 264/334 |
| 4,600,370 A | | 7/1986 | Kaneko | |
| 4,608,219 A | | 8/1986 | Singh | |
| 4,784,422 A | * | 11/1988 | Jones | B25J 15/0028 294/106 |
| 2013/0200641 A1 | | 8/2013 | Masclaux | |

OTHER PUBLICATIONS

International Search Report for PCT/FR2013/051115 dated.

* cited by examiner

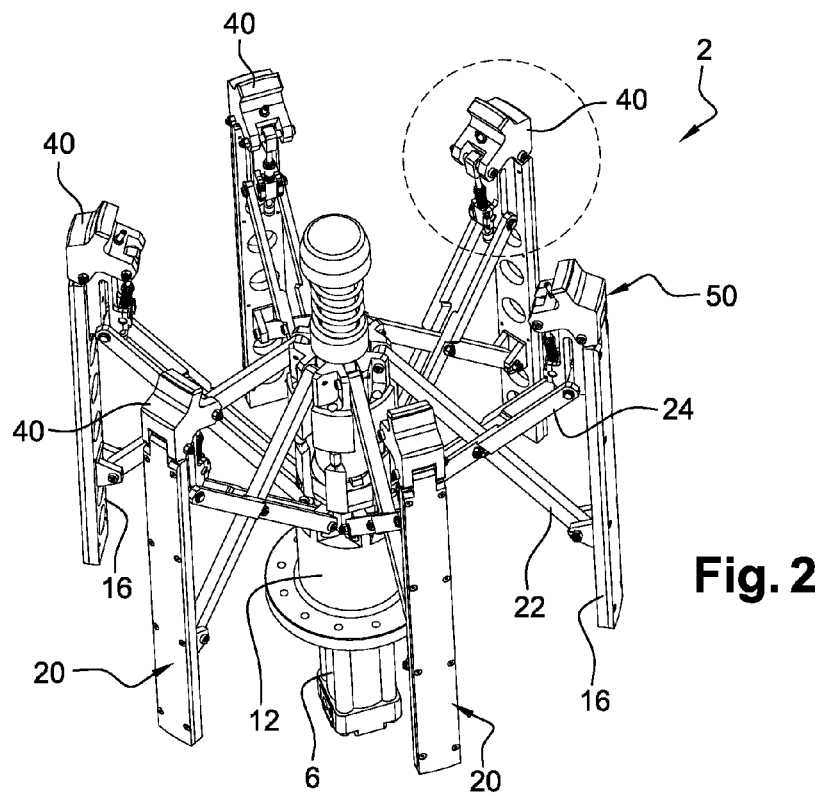
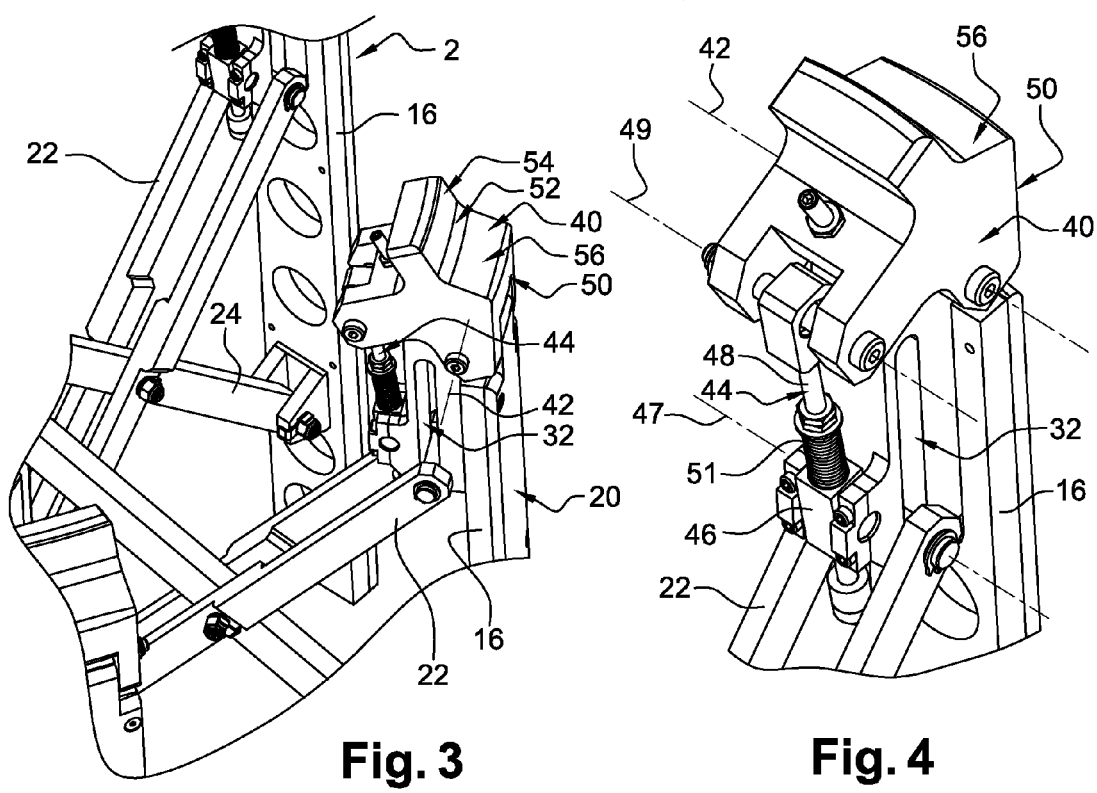
Fig. 2
Fig. 3  Fig. 4

DEVICE FOR SUPPORTING A RAW RUBBER TIRE FOR THE MANUFACTURE OF A PNEUMATIC TIRE

This application is a 371 national phase entry of PCT/FR2013/051115, filed 23 May 2013, which claims benefit of French Patent Application No. 1255262, filed 6 Jun. 2012, the entire contents of which are incorporated herein by reference for all purposes.

BACKGROUND

1. Field

The disclosure relates to the manufacture of vehicle pneumatic tires and in particular to the handling of the tires.

2. Description of Related Art

The manufacture of a pneumatic tire requires the creation of a tire comprising raw rubber and reinforcing elements. The raw rubber is soft and behaves plastically so that the tire has a tendency to collapse under its own weight. In order to store it and to transport it between the manufacturing workstations, it is therefore necessary for it to be supported by a suitable device. What is sometimes referred to as a "tulip" can be used to do this. The tulip comprises arms that are able to support the upper bead of the tire when the tire has its main axis vertical. The dimensional characteristics of the tire are thus preserved, notably while the tire is being transported from the workstation at which it is built to the curing press for vulcanizing the rubber and obtaining the pneumatic tire casing. However, separating the tire from the tulip is a tricky operation because it has to be performed without the arms knocking the tire, given that the rubber is still particularly fragile at this stage.

SUMMARY

One object of embodiments of the invention is to facilitate the extraction of the tire from the support device.

To this end, an embodiment of the invention provides a device for supporting a raw rubber tire for the manufacture of a pneumatic tire, which comprises arms each bearing a block articulated to the arm and arranged to extend above it, each block having an upper face arranged to support an upper bead of a tire and a lower face arranged to be actuated by a lower bead of the tire each block being arranged in such a way that, with the block extending as a projection from the arm in a direction radial to a main axis of the device on an opposite side of the arm to the axis, an upward force on the lower face places the block in a position in which it no longer extends as a projection from the arm in the radial direction on that said side of the arm.

Thus, in a first position, the blocks of the device extend projecting radially and support the tire via the upper bead thereof and, in the second position, the blocks are actuated upwards by the lower bead of the tire and allow the tire to pass and be removed from the device. The tire can thus easily be extracted from the device without the risk of damaging it. Further, this step can even be speeded up in order to gain productivity. In addition, the extraction of the tire may take place without moving the arms. That means that there is no need to bring the arms in closer to one another in order to extract the tire. Now, that represents a significant advantage when the device is mounted on a transport means such as a carriage that has no power supply. This is because it means that the tire can be off-loaded without the need to couple the device to a power source beforehand after the carriage reaches the offloading site. It is therefore possible to reduce the cycle time and achieve a gain in productivity. In addition, as there is no need to resort to a power source at this stage, the use of the device is more economical.

Advantageously, the upper face is arranged to support a lower part of the upper bead and the lower face is arranged to be actuated by an upper part of the lower bead.

For preference, each block is arranged in such a way that, in the position in which it no longer extends as a projection, a peripheral face of the block extends in the continuation of a peripheral face of the arm.

Thus, this layout of the faces further reduces the risk of the tire being knocked by a projecting element of the device and makes the tire easier to extract.

Advantageously, the arms have a peripheral face having a vertical rectilinear generatrix.

This shape of the arms means that the arms can be rested upon in order to guide the tire when it is being extracted.

Advantageously, the device comprises return means tending to place each block in projection from the arm in the direction radial to the axis.

Thus, the block returns spontaneously to its position projecting from the arm as soon as it is no longer prevented from doing so. That makes the configuration in which the device holds a tire more reliable.

For example, each arm bears a return member articulated, on the one hand, to the arm and, on the other hand, to the block.

Advantageously, the upper face is of concave shape.

This shape of the block offers stable support for the upper bead of the tire.

For preference, the arms are mounted with the ability to move with respect to the axis in a direction radial to the axis.

For example, the arms are mounted with the ability to slide with respect to the axis in a direction radial to the axis.

The arms can thus be placed in a retracted position to make it easier to install the tire on the device.

The invention, in an embodiment, also provides a method for handling a raw rubber tire for the manufacture of a pneumatic tire, which has the following successive steps:

blocks of a device support an upper bead of the tire so that a main axis of the tire is vertical; and the tire is slid with respect to the device in such a way that a lower bead of the tire moves the blocks in order to overcome them.

Thus, there is no need to provide a special operation for effacing the blocks.

Provision may be made for the blocks to support a lower part of an upper bead of the tire.

For preference, arms of the device are each simultaneously in contact with the upper and lower beads.

Such a hold allows the dimensional characteristics of the tire to be preserved while the tire is in storage and being transported.

BRIEF DESCRIPTION OF DRAWINGS

We shall now set out one embodiment of the invention by way of nonlimiting example and in support of the drawings in which:

FIG. 2 is a perspective view of the device of FIG. 1;

FIGS. 3 and 4 are views on a larger scale showing one of the blocks of the device of FIG. 2;

DETAILED DESCRIPTION OF SPECIFIC EMBODIMENTS

Figure 1:
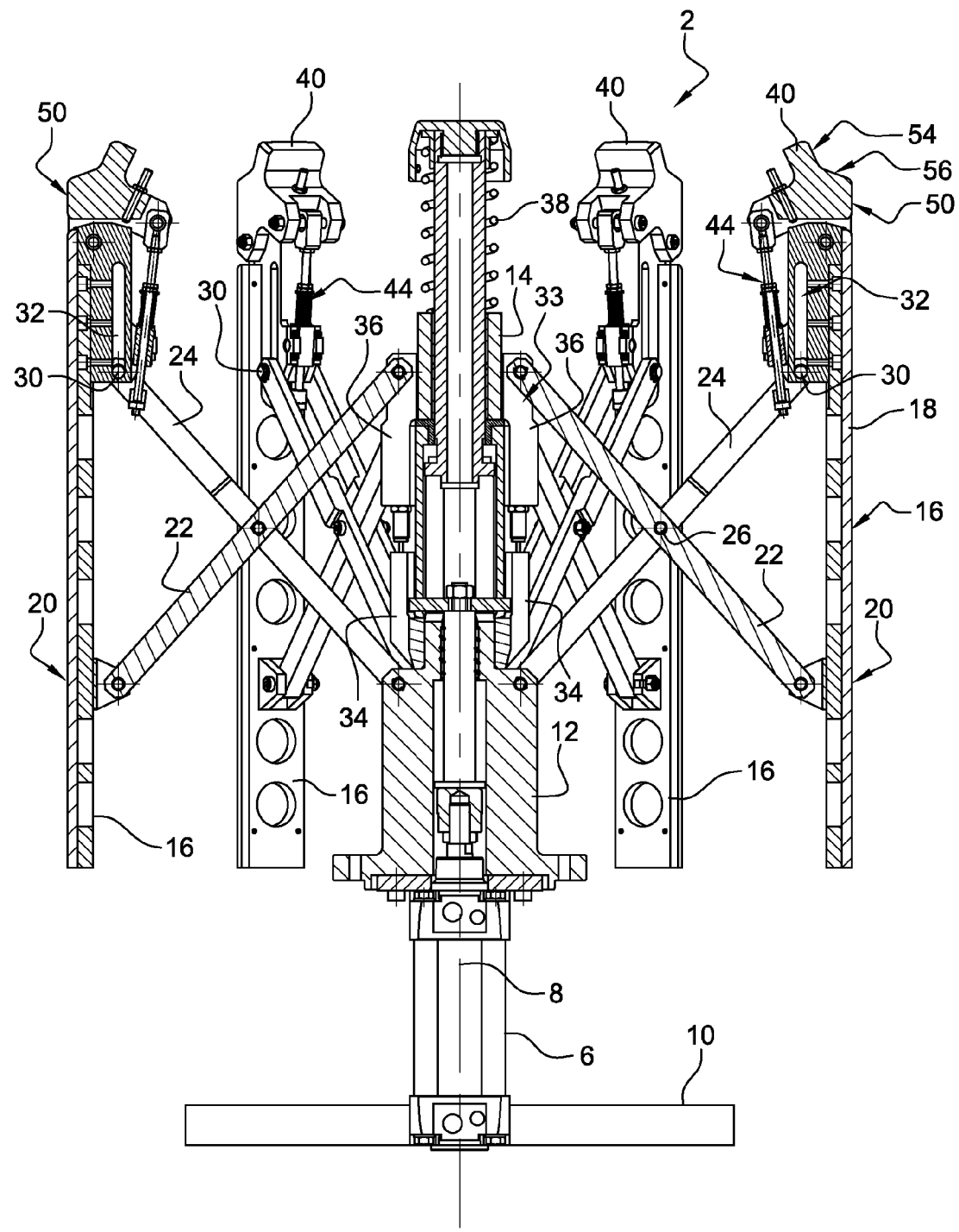
FIG. 1 is a view in axial section of a device according to one embodiment of the invention.

The figures depict a device 2 used to support a tire 4 of a pneumatic tire. This tire comprises raw rubber and reinforcing elements and has been illustrated schematically in FIGS. 5 to 7.

The device 2 comprises a central mast 6 having a vertical main axis 8. It also comprises a lower structure 10 to which the foot of the mast is rigidly fixed and which is itself for example mounted on a tire transport carriage, as will be seen later on.

The device 2 comprises a base 12 having an overall shape with symmetry of revolution of axis 8 coaxial with the mast to which it is rigidly fixed. It also comprises an upper ring 14 likewise of an overall shape having symmetry of revolution of axis 8 and mounted with the ability to slide along this axis in relation to the base.

The device 2 comprises arms 16, in this instance six of them, this number being nonlimiting and potentially being lower or higher than this value. The arms are identical to one another. Each arm 16 comprises a rigid body 18 having a peripheral external face 20 of cylindrical shape such that the cylinder has, as its axis, the axis 8 and has a circular horizontal cross section. The faces 20 therefore have vertical rectilinear generatrixes and form discontinuous portions of this same cylinder.

For each arm 16, the device comprises two rectilinear link rods 22 and 24 articulated directly to one another at their middle about a horizontal axis perpendicular to the direction radial to the axis 8. The link rod 22 has a peripheral lower end articulated directly to the arm 16 and an internal upper end articulated to the ring 14. The link rod 24 has an internal lower end articulated directly to the base 12 and a peripheral upper end connected to the arm at a point extending higher up than the articulation of the link rod 22 to the arm. These articulations of the link rods have axes parallel to the axis 26. The upper end of the link rod 24 bears a finger 30 mounted such as to be able to slide in the vertical direction in a groove 32 of the arm.

Figure 5:
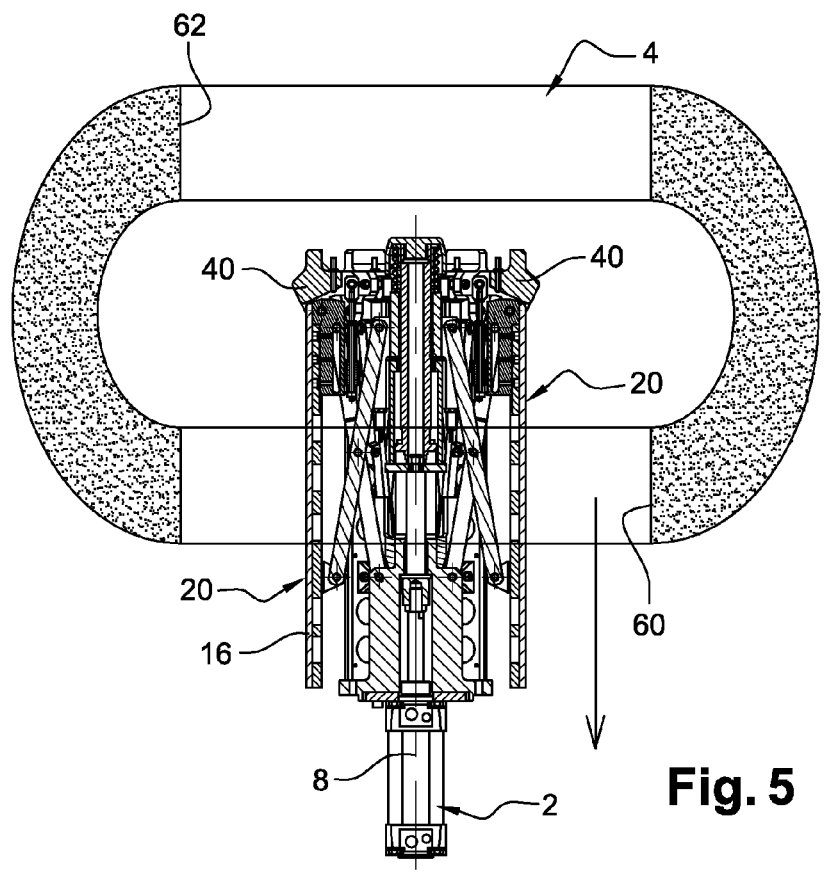
FIGS. 5 to 7 show three steps in the implementation of the method of the invention using the device of the preceding figures.
Figure 6:
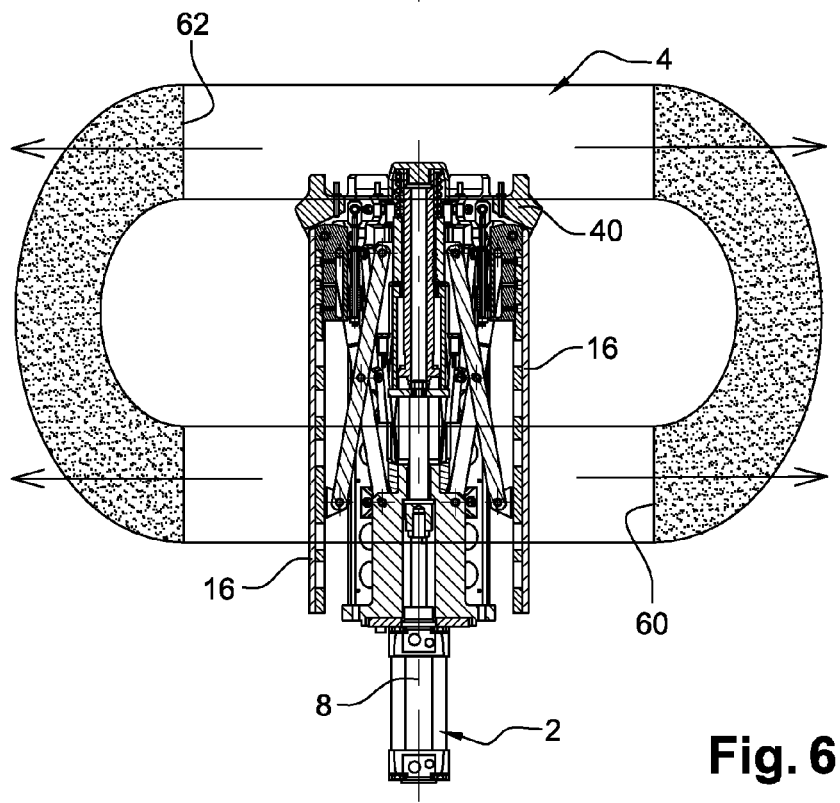

For each arm, the device comprises an actuator 33 in the form of an actuating cylinder comprising a piston 34 rigidly fixed to the base 12 and a body 36 rigidly fixed to the ring 14 and with respect to which the piston is mounted such that it can slide in a direction parallel to the axis 8. It is to the body 36 that the upper end of the link rod 22 is directly articulated. Through this arrangement, control of the actuating cylinders 33 allows the ring 14 to be made to slide upwards and causes each of the arms 16 to slide towards the axis 8 in the radial direction. This is how the arms are retracted. This retracted configuration of the device is illustrated in FIGS. 5 and 6. The reverse movement of these elements causes the arms to extend in order to obtain the extended configuration of the device, which is the configuration illustrated in FIGS. 1, 2 and 7. The tulip is said to be respectively closed and open. During these movements, the arms, particularly the external face 20 thereof, remain vertical.

The mast 6 bears a return spring 38 connected by its upper end to the upper end of the mast and by its lower end to the ring 14. It forces the ring 14 downwards in order by default to tend to position the tulip in the open configuration.

The upper part of the arms will now be described with reference notably to FIGS. 3 and 4. The device comprises blocks or noses 40 situated at the respective upper ends of the arms to extend above them. The block 40 of each arm is articulated at the upper end of the latter directly about a horizontal axis 42 parallel to the axis 26. For each arm, the device further comprises a spring-loaded actuating cylinder 44 comprising a body 46 and a rod 48 mounted such that it can slide in the body 46 in a longitudinal direction of the rod and urged in a direction away from the body by a spring 51. The body 46 is directly articulated to the arm 16 about an axis 47, whereas the rod 48 is directly articulated to the block 40 about an axis 49, these two axes being parallel to the axis 26.

The block 40 has a peripheral external face or lower face 50 having the same cylindrical shape as the face 20 of the arm. The block is able to adopt a position about the axis 42, which position is illustrated in FIG. 3, such that the faces 20 and 50 extend in the continuation of one another, the face 50 of the block having the axis 8 as its axis. This is the retracted or effaced position of the block. The faces 20 and 50 are therefore oriented in the opposite direction to the axis 8. In this position, the face 50 constitutes the part of the block that is furthest from the axis 8. In addition, the block does not extend as a projection from the face 20 of the arm in the radial direction and in the direction away from the axis. This position of the block is adopted against the action of the return force of the actuating cylinder 44 which has a tendency to make it leave this position.

As illustrated in FIGS. 5 and 6, the block is also able to adopt a position about the axis 42, which position is such that the block, notably the face 50 thereof, extends as a projection from the face 20 of the arm in the radial direction and in the opposite direction to the axis.

The block 40 also has an upper bearing face 52 of concave shape. In this particular instance, this face has two facets 54 and 56 with symmetry of revolution of axis 8 giving this face an obtuse-angle profile in a plane radial to the axis 8.

In the two positions of the block, the lower facet 56 is oriented upwards and in the direction away from the axis 8. In the projecting position illustrated in FIG. 5, the upper facet 54 is directed in the radial direction and in the direction away from the axis 8. In the retracted position illustrated in FIGS. 3 and 4, the upper facet 54 is directed upwards.

We shall now describe an embodiment of the method according to the invention using this device. It is assumed that a tire 4 for a pneumatic tire has been built by assembling raw rubber elements and reinforcing members.

With reference to FIG. 5, a first step involves placing the tire 4 on the device 2. The tire is initially supported by suitable means that have not been illustrated. The device 2 is initially in the retracted configuration, with the blocks occupying their projecting position. The axis 8 is vertical. The tire is offered up in such a way that the main axis thereof coincides with the axis of the device. The tire extends above the device. It is slid downwards so that it surrounds the device until the lower bead 60 of the tire is positioned facing the face 20 of the arms in the radial direction and an upper bead 62 of the tire is facing the face 52 of the blocks in the radial direction.

This is the position that has been reached in FIG. 6. The device is then made to pass from the retracted configuration into the extended configuration by actuating the actuating cylinders 33. As a result, the arms 16 slide until the lower part bears radially against the lower bead 60 and until the blocks 40 come to bear against the upper bead 62. More specifically, the lower part (or axially lower part with reference to the axis 8) of the upper bead becomes lodged in the hollow of the face 52. It is supported against further downward movement by the facet 56 and against movement towards the axis 8 by the facet 54. The upper bead 62 is therefore supported by the blocks 40. The tire is therefore supported by the device and need no longer be supported by the other means.

The assembly formed of the device and the tire can be stored and moved around in this configuration, for example to bring the tire on a carriage as far as a curing press.

Figure 7:
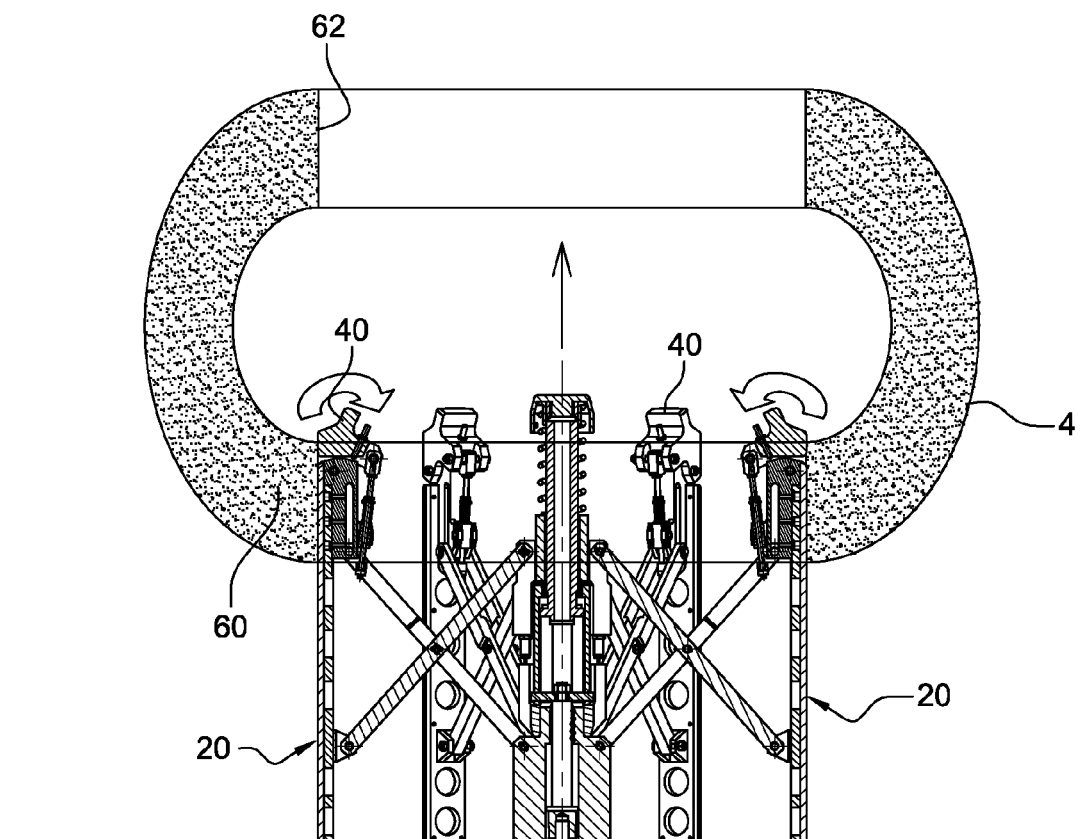
Figure 8:
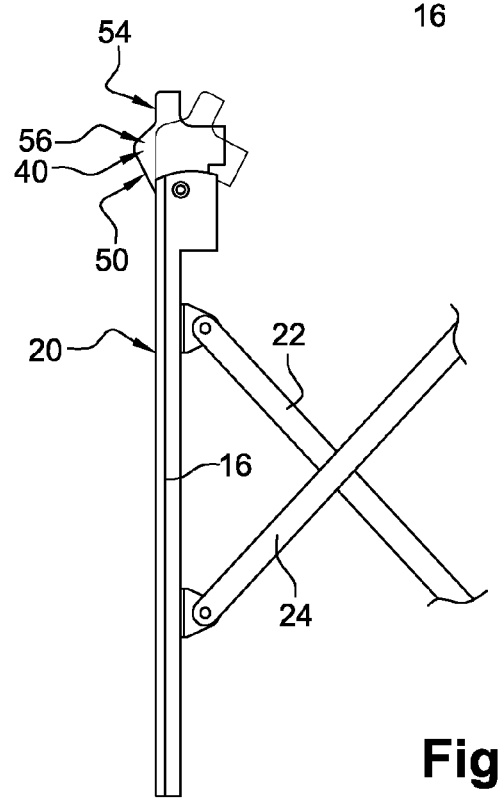
FIG. 8 is a simplified elevation showing the dynamics of one of the blocks of the device of FIG. 1.

With reference to FIG. 7, in order to extract the tire from the device, the tire is slid upwards in the direction of the axis 8 with respect to the device. During this movement, the upper bead 62 leaves the blocks. In addition, the lower bead 60 runs along the face 20 of the arms until it comes into contact via its upper (or axially upper) part with the face 50 of the blocks which at that time is directed downwards. The stiffness of the spring 51 is sufficiently low that the force applied upwards by the lower bead 60 on the face 50 causes the blocks to pivot towards the main axis 8 about the axis 42 until the blocks have been placed in the effaced position. The upward movement of the lower bead 60 can then continue, pressing against the face 50 of the blocks, which face is now situated in the continuation of the face 20 of the arms, as illustrated in FIG. 7. The tire can finally be completely extracted from the device. The rotation of the block from one of these two positions into the other has notably been illustrated in FIG. 8.

As can be seen, there is no need to return the device to the retracted configuration in order to extract the tire from the device. That means that productivity can be increased by shortening the cycle times.

The device of an embodiment of the invention allows the tire to be stored and transported while at the same time preserving the dimensional characteristics thereof. It allows the tire to be extracted from the device rapidly without damaging it.

The device forms part of an installation for the manufacture of vehicle wheel pneumatic tire casings. These may be vehicles of the lightweight type, passenger vehicles, utility vehicles, vehicles of the heavy goods type or alternatively, civil engineering vehicles.

Figure 9:
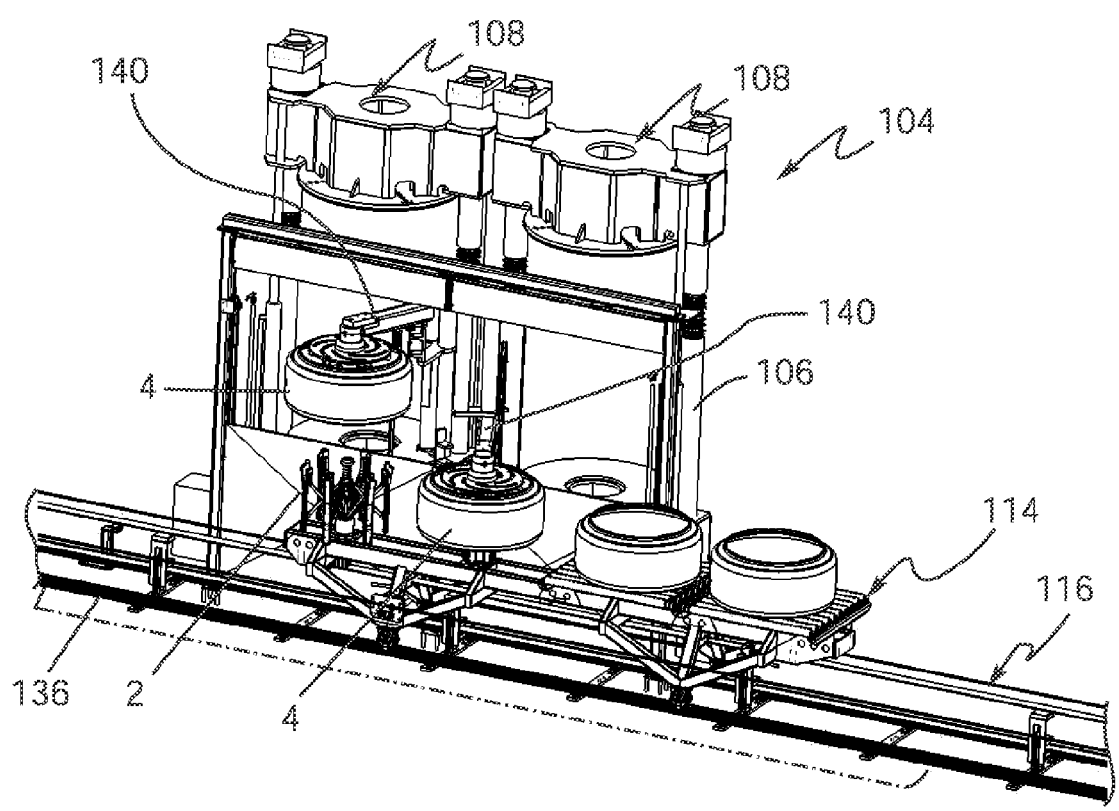
FIG. 9 is a perspective view of a tire curing installation comprising the device of FIG. 1.

With reference to FIG. 9, the installation 104 for example comprises a curing workstation 106 comprising one or more curing presses 108, in this instance two curing presses, that allow the rubber to be vulcanized and a tire casing to be obtained.

The installation comprises a transport member 114 mounted with the ability to move with respect to the workstation 106 on a guide track 116. The member 114 is formed here of a carriage which comprises a structure bearing devices 2 of which in this particular instance there are two. These are two identical supports each able to support a raw tire. The carriage also comprises tire casing supports which in this particular instance are formed as a roller table.

The guide track 116 in this particular instance extends along the ground and is rigidly fixed thereto. Here it forms a railway track. It extends in a rectilinear horizontal direction. It comprises two lateral rails 136. The carriage 114 comprises four legs each bearing a wheel able to rest against one of the two rails. The carriage is thus mounted in such a way as to run along the track.

The track extends from a workstation for loading raw tires that are intended to be cured. It extends also as far as a workstation for the cooling of the cured tire casings. It also passes near the workstation 106. More specifically, the track 16 intercepts a loading and unloading zone of the workstation 106. This loading and offloading is performed by at least one member such as a jib crane 140. In this zone, the raw tires situated on the carriage can therefore be transported by one of the jib cranes from the carriage to the corresponding press and the cured tire casings can be transported from the presses to the carriage.

Of course, numerous modifications may be made to the invention without departing from the scope thereof.

The invention claimed is:

1. A device for supporting a raw rubber tire (4) for the manufacture of a pneumatic tire, which comprises arms each bearing a block articulated to the arm and arranged to extend above it, each block having an upper face arranged to support an upper bead of a tire and a lower face arranged to be actuated by a lower bead of the tire, wherein each block is arranged in such a way that, with the block extending as a projection from the arm in a direction radial to a main axis of the device on an opposite side of the arm to the axis, an upward force on the lower face places the block in a position in which it no longer extends as a projection from the arm in the radial direction on that said side of the arm, and the arms are mounted with the ability to move with respect to the axis in a direction radial to the axis.

2. The device according to claim 1, wherein each block is arranged in such a way that, in the position in which it no longer extends as a projection, a peripheral face of the block extends in the continuation of a peripheral face of the arm.

3. The device according to claim 2, wherein the arms have a peripheral face having a vertical rectilinear generatrix.

4. The device according to claim 2, further comprising return means tending to place each block in projection from the arm in the direction radial to the axis.

5. The device according to claim 2, wherein each arm bears a return member articulated, on the one hand, to the arm and, on the other hand, to the block.

6. The device according to claim 2, wherein the upper face is of concave shape.

7. The device according to claim 1, wherein the arms have a peripheral face having a vertical rectilinear generatrix.

8. The device according to claim 1, further comprising return means tending to place each block in projection from the arm in the direction radial to the axis.

9. The device according to claim 1, wherein each arm bears a return member articulated, on the one hand, to the arm and, on the other hand, to the block.

10. The device according to claim 1, wherein the upper face is of concave shape.

11. The device according to claim 1, wherein the arms are mounted with the ability to slide with respect to the axis in a direction radial to the axis.

12. A method for handling a raw rubber tire for the manufacture of a pneumatic tire, comprising the following successive steps:

supporting an upper bead of the tire with blocks of a device so that a main axis of the tire is vertical; and sliding the tire with respect to the device in such a way that a lower bead of the tire moves the blocks in order to overcome them.

13. The method according to claim 12, wherein the blocks support a lower part of an upper bead of the tire.

14. The method according to claim 13, wherein arms of the device are each simultaneously in contact with the upper and lower beads.

15. The method according to claim 12, wherein arms of the device are each simultaneously in contact with the upper and lower beads.

* * * * *